United States Patent [19]
Wentworth

[11] 3,816,724
[45] June 11, 1974

[54] SYSTEM FOR WELDING CONTROL
[75] Inventor: Fitzwilliam Allan Wentworth, Mosman, Australia
[73] Assignee: Cutler-Hammer Inc., Milwaukee, Wis.
[22] Filed: Sept. 18, 1972
[21] Appl. No.: 289,807

[30] Foreign Application Priority Data
Sept. 22, 1971 Australia............................ 6380/71

[52] U.S. Cl............. 235/151.1, 219/114, 235/183, 307/294, 328/75
[51] Int. Cl....................... G06g 7/66, H03k 17/30
[58] Field of Search ........ 235/183, 197, 151, 151.1; 328/75, 127, 146, 149; 307/235, 293, 294; 219/111, 114, 115

[56] References Cited
UNITED STATES PATENTS

| 3,105,939 | 10/1963 | Onno et al. | 328/146 |
| 3,202,839 | 8/1965 | Allmark | 307/235 |
| 3,397,323 | 8/1968 | Hirsch | 307/293 |
| 3,596,113 | 7/1971 | Seidler | 307/293 |
| 3,612,975 | 10/1971 | Keefe | 328/146 |
| 3,660,693 | 5/1972 | Markey | 307/293 |
| 3,670,180 | 6/1972 | Grossimon et al. | 307/293 |
| 3,688,131 | 8/1972 | Hirsch | 328/146 |
| 3,694,669 | 9/1972 | Witt et al. | 307/293 |

Primary Examiner—Felix D. Gruber
Attorney, Agent, or Firm—Hugh R. Rather, William A. Autio

[57] ABSTRACT

A control system for timing the occurrence and duration of functions occurring in a sequence in an industrial process, in which a single RC charging circuit initiates an output signal from a voltage comparator when its charged voltage exceeds the voltage also applied to the comparator from one of a plurality of resistive circuits which are assigned to respective functions and selectively connected one at a time to the comparator in accordance with the function sequence.

11 Claims, 4 Drawing Figures

SYSTEM FOR WELDING CONTROL

This invention relates to control means for the timing of function occurring in electrical welding or in other processes employing sequential functions. Reference made to the timing of functions is intended to relate to both timing of the switching of functions in a sequence as well as timing of individual functions.

Generally, in control systems presently in use each timed sequence during say a welding operation is determined by analogue or digital means. The latter involves cycle counting and complicated circuitry but has an absolute accuracy, while the former, although not so accurate is important due to its lower cost.

Many existing designs of the analogue type use a separate R.C. circuit for each function. In general each timed sequence is terminated by the firing of a Unijunction transistor, or similar trigger device, when the capacitor has been charged to a specific voltage level. The time required to reach this voltage level is varied by the use of a variable resistance for the R component. In so far as it is useful to provide control with a logarithmic scale it is common practice to use a logarithmic "volume control" of the radio type however such controls have not been entirely satisfactory because they are not capable of approaching desirable degrees of accuracy.

A disadvantage of all these circuits lies in the use of the logarithmic potentiometers which, because of the high value of resistance required, must be of the "carbon element" type with the consequent inability to obtain units matched to the same resistance law. Individual calibration of the various controls is very expensive and still does not provide for the problem of replacements. A further limitation of this system is that the time delay is voltage dependent.

It is the main object of the invention to provide a control system for the sequential timing of functions in an industrial process which system is relatively inexpensive and substantially avoids the above drawbacks.

In accordance with this invention there is provided a control system for the timing of functions to occur in a predetermined sequence in an industrial process, and comprising electrical potential supply means, a voltage developing RC charging circuit connected to the supply means, a plurality of resistive circuits connected in parallel to the supply means each being assigned to the timing of a respective function, a voltage comparator circuit having two inputs a first one of which is connected to the RC carging circuit, and means for connecting a selected one of the resistive circuits to the second input of the voltage comparator circuit, said voltage comparator circuit deriving an output control signal when the voltage of the RC charging circuit exceeds a voltage applied by the connected resistive circuit.

The invention will now be described by way of example as applied to the control of an electrical welding process, with reference made to the accompanying drawings, in which.

Figure 1:
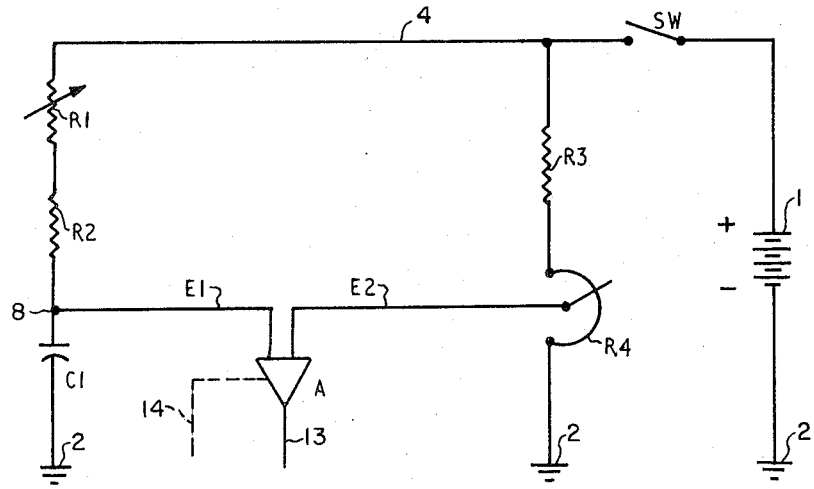
FIG. 1 depicts a simplified basic circuit of a control system according to this invention.

The preferred control system shown in the drawings employs a common RC charging circuit and trigger device. A separate wire wound potentiometer may be provided for the timing of each function with all potentiometer circuits supplied from the same voltage rail as that supplying the RC circuit. The potentiometer outputs may be selected in the proper sequence by a shift register, or other suitable means, and provide a voltage reference against which the voltage on the charging capacitor is compared by the trigger device. By selection of the potentiometer voltage level at maximum setting use is made of the exponential nature of the charging function to shape the time scale as required.

Apart from the advantage of being able to accurately predict and print the time calibrations on a production basis a further advantage lies in the fact that a single calibration adjustment of R1 will ensure that all sequences are correct.

With specific reference to FIG. 1, there is shown by way of background a basic circuit where a voltage comparator A provides an output signal when voltage $E_1 > E_2$. When the switch SW is closed capacitor C1 will charge until this condition is met. Adjustment of voltage $E_2$ by means of potentiometer R4 provides for a time delay ranging between zero and some maximum determined by the time constant $(R1 + R2) - C1$ and the ratio of R3 to R4. By selection of this latter ratio advantage may be taken of the exponential nature of the rise in voltage E1 to provide for a logarithmic calibration of potentiometer R4 to the required extent. An important advantage of the circuit, due to the use of a common voltage supply source, is that the time delay is independent of the supply voltage level. As is readily apparent in FIG. 1 the foregoing is achieved by the provision of a D.C. voltage supply 1 having one pole connected to ground or common rail 2 and the other pole connected through switch SW to a supply rail 4. Capacitor C1 is connected to common rail 2 and through the series connected resistors R1 and R2 to supply rail 4. A voltage divider comprising a resistor R3 in series connection with a wire wound potentiometer R3 is similarly connected between the same supply rail 4 and common rail 2. The junction point 8 of capacitor C1 and resistor R2 is connected to one input terminal 11 of voltage comparator A which has its common link or other input terminal 12 conneted to the wiper of the potentiometer R4. The voltage comparator A has an output connection 13 which may be applied to a utilization means as is desired.

Suitable voltage comparators are available in integrated circuit form and are usually provided with a "strobe" input 14 which ensures that the output will respond to the input voltage conditions only when the strobe input is high. If a voltage pulse is supplied to this strobe input synchronously with the line voltage the output will be similarly synchronized. Voltage comparator A will function to provide an output at 13 whenever Strobe input 14 has an enabling voltage applied to it and the input voltage on circuit point 8 exceeds that of point 12. The actual differential voltage and offset required to produce an output at 13 will depend on the particular comparator used but is typically less than one millivolt for the circuit shown.

Now let it be assumed that the switch SW is open, the capacitor C1 is discharged, an enabling voltage is present at 14 and the potentiometer R4 is set to provide some voltage greater than zero to input terminal 11.

Under these conditions E2 is greater than E1 and voltage comparator A will provide no output voltage at output connection 13. If the switch SW is now closed, the capacitor C1 will charge through the resistors R1 and R2 and the voltage on point 8 (E1) will rise exponentially. After some time delay E1 will exceed E2, on circuit terminal 12, and the voltage comparator A will than switch to provide an output.

It should be apparent that the time delay between closing the switch SW and switching of comparator A is not a function of the voltage level between rails 2 and 4 and is determined only by the percentage of the total voltage acquired by capacitor C1 in relation to the percentage of the total voltage selected by the potentiometer R4. In this sense the circuit is a bridge arrangement with comparator A connected across a diagonal and acting as a polarity sensitive null detector. Thus is it apparent that the total resistance in the bridge arm comprising R3 and R4 is not significant and consequently it is feasible to choose relatively low values of resistance within the range applicable to wire wound precision potentiometers. The resistors R1 and R2 on the other hand may be chosen to have high values of resistance to permit use of an economically small timing capacitor. Resistor R1 is shown as an adjustable type to provide a trimming adjustment for calibration purposes only, but may equally well be a fixed type specially seleted for particular applications.

It is important to note that the loading imposed by comparator A does not disturb the normal current conditions in each arm of the bridge circuit as the input side connected to the high impedance leg of the bridge comprising capacitor C1 in series with resistors R1 and R2 represents a satisfactorly high impedance which does not disturb the operation of the circuit. The other leg of the bridge comprising low impedance elements R3 and R4 is sized to supply the minute current required by the higher voltage input side of voltage comparator A.

Figure 2:
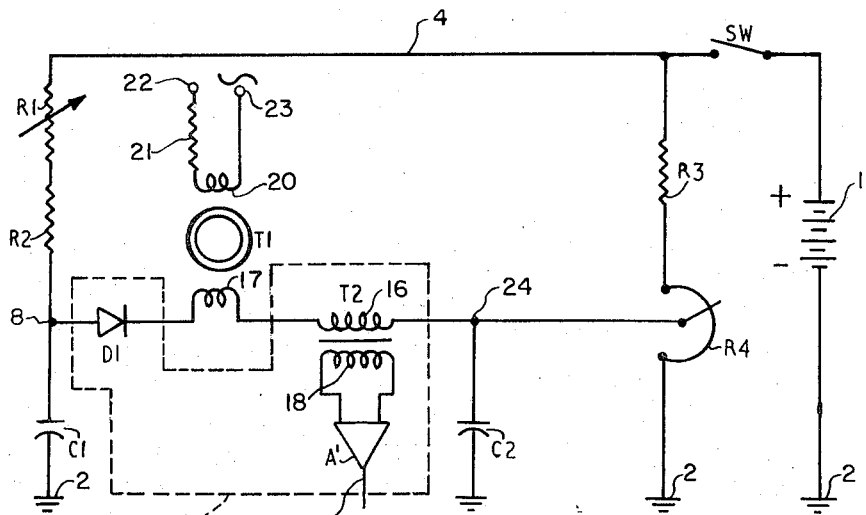
FIG. 2 shows an alternative form of the circuit of FIG. 1.

An alternate circuit arrangement illustrating a modification to the basic circuit, is shown in FIG. 2 where synchronizing pulses are derived from a saturating core T1. Until the expiry of the time delay, diode D1 is blocked and no output is present at the pulse transformer T2 secondary. When the voltage on capacitor C1 is sufficient a voltage pulse will be applied to transformer T2 primary through diode D1 and the series combination of capacitor C1 and C2, and thus via the transformer T2 secondary through an amplifier A' to the output. This circuit variation provides low loading on capacitor C1 and a sustantial pulse input to the transformer T2.

In this embodiment the basic "bridge" elements remain as before with the voltage and polarity sensing means shown within the boundaries of the dotted outline 15. Pulse transformer T2 is an essential adjunct to this system and a simplified form thereof is shown in series connection between the diode D1 and the pulse transformer primary 16. The capacitor C2 completes the A.C. path for the pulse currents. This balance sensing or voltage comparator arrangement will now be considered in more detail.

The main timing capacitor C1 is connected through circuit point 8 to a series circuit comprising silicon diode D1, secondary winding 17 on the small saturable magnetic core T1, primary winding 16 of a pulse transformer and capacitor C2, back to the common rail 2 and thence to the common side of the main timing capacitor C1. The secondary winding 18 of pulse transformer T2 is connected through amplifier A' to output terminal 13, which again may be applied to such utilization means as is desired.

The small saturable magnetic core T1 is provided with a drive winding 20 which is connected in series with a current limiting resistor 21 to a source of A.C. voltage impressed on terminals 22 and 23. The magnetic core T1 has a rectangular hysteresis loop, and the alternating current through the winding 20 alternately drive the flux hard into saturation in the positive and negative directions. As the flux is switched after each current zero crossover point, a voltage pulse is generated in the secondary winding 17, and the number of turns on this winding are chosen to provide a peak pulse voltage slightly below the conduction voltage of the diode D1.

Immediately after the switch SW is closed to commence a timing sequence, the D.C. voltage at common link or circuit terminal 24 is more positive than that on point 8, and in consequence, the diode D1 is blocked and represents an open circuit to the pulses produced by winding 17. No pulse currents will be applied to the pulse transformer T2 and the output of the amplifier A' will be zero. The capacitor C1 will charge normally through the resistors R1 and R2 until the D.C. voltage on point 8 slightly exceeds that on circuit point 24. Now the next voltage pulse in winding 17 will be sufficient to unblock diode D1 and cause a current pulse through the series circuit C1, D1, 17, 16 and C2 with the return via the common rail 2. A corresponding voltage pulse on the secondary winding 18 will be amplified and appear at the output terminal 13 where it may be used to trigger the external circuitry. It is important to recognize that the D.C. voltage on the capacitor C1 does not provide energy which derives from the pulse generator only, and in consequence the D.C. charging circuit of capacitor C1 is not loaded.

Figure 3:
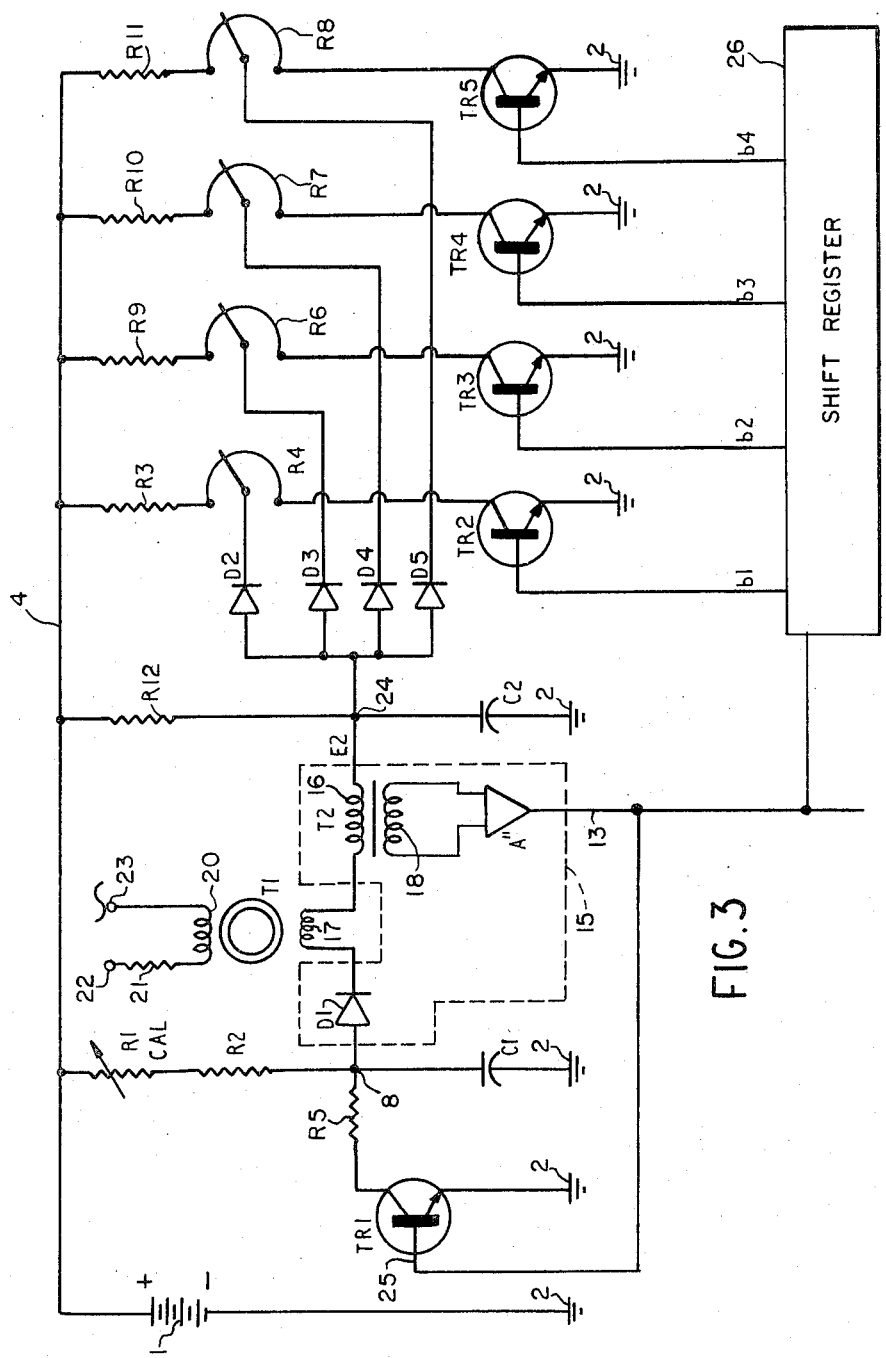
FIGS. 3 and 4 show two of the many possible arrangements for selecting resistive circuits assigned to the timing functions.
Figure 4:
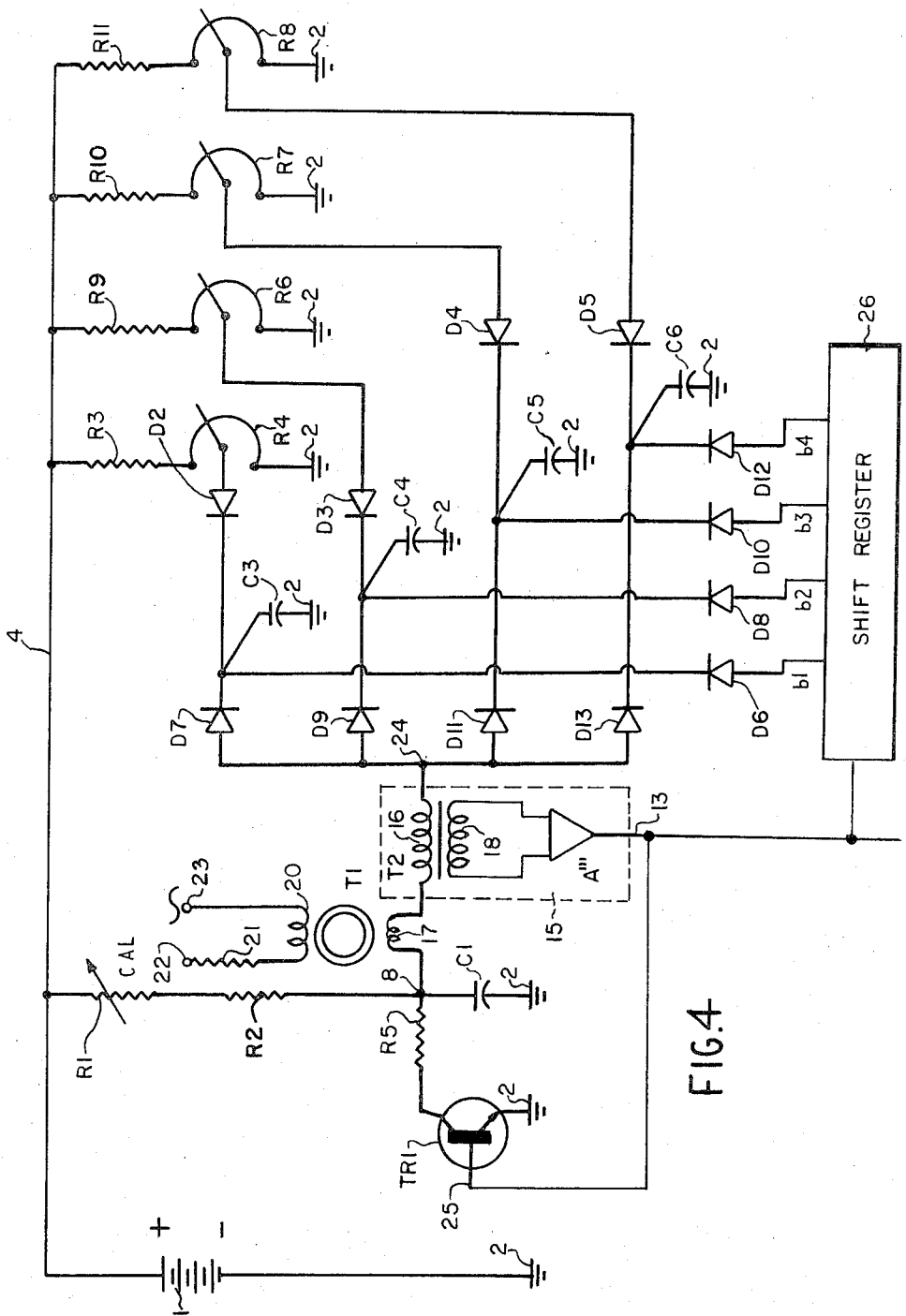

In practice, of course, a number of functions will be required to be timed in a predetermined sequence. In the case of an electric resistance welding process the functions requiring to be timed may be the intervals of squeeze delay, squeeze, weld period, hold period and off. The control system will, therefore, include a plurality of resistive circuits (R3 – R4) each assigned to a respective function. They will be selected in a prearranged sequence according to the phases of the process for connection to the comparator circuit (D1 – T2 of FIG. 2, or A of FIG. 1). A shift register of known form (now shown) may have its individual outputs connected to derive sequential connection of the resistive circuits. FIGS. 3 and 4 are illustrative of such devices.

FIG. 3 is a schematic representation of the instant invention which is similar in context to the basic circuit showing a preferred arrangement for replacing the manually operated switch SW with a transistor switch, and for remotely programming four individually adjustable timing periods by other transistor switches. When the transistor TR1 is turned on by a positive current into the base terminal 25, any voltage on the timing capacitor C1 will be discharged through the resistor R5 which has a low resistane value with respect to the series arrangement of R1 and R2 thus ending the timing sequence operation. The timing sequence is started by turning off transistor TR1 permitting capacitor C1 to start charging and the voltage on circuit point 8 to rise with respect to the common rail 2.

FIG. 3 further shows four potentiometers R4, R6–R8 each supplied from rail 4 through resistors R3, R9–R11 respectively and each with a transistor switch TR2-TR5 completing the series arangement to the common rail 2. The wiper of each potentiometer is connected through a diode D2–D5 to the common link or circuit point 24. A resistor R12 connects between supply rail 4 and circuit point 24 and this latter point has an A.C. current path to rail 2 via capacitor C2.

The capacitor C2 is chosen such that its time constant with resistor R12, C2 X R12, is less than that of the main timing circuit C1 (R2 + R1), to ensure that the voltage on point 24 will always rise faster than that on point 8 when power is first applied to the equipment, however, this condition is not critical or essential to the proper operation of the circuit.

For purposes of describing the operation of this programming arrangement it will be assumed that transistor TR2 is turned on by a positive current to the terminal $b1$ and that transistors TR3-TR5 are turned of, i.e., no curent is supplied thereto. A direct current will now flow from the supply rail 4 through the resistor R12, the diode D2 into the wiper of the potentiometer R4 and through the transistor TR2 back to the common rail 2. Diodes D3–D4 will be blocked since their cathodes are at rail 4 voltage. Since resistor R12 has a value which is very high in comparison to that of resistor R3 or potentiometer R4, the voltage at circuit point 24 will be substantially that selected by potentiometer R4, plus one diode drop.

Thus, when a positive current is applied to one of the input terminals $b1, b2, b3$ or $b4$, the corresponding potentiometer setting will be effetive in programming the voltage E2 on circuit point 24 and if the holding current is thereafter removed from terminal 25, the selected time delay will start to time out. The output pulse from amplifier A'' is used to reapply an input to terminal 25 for a fixed period to discharge capacitor C1, and used to trigger the shift register 26 to select another of the b inputs for the next time sequence.

Suitable shift registers for various numbers of switched steps, are readily available in standard digital integrated circuit forms, and if diode-transistor logic or transistor-transistor logic is used the output terminal of the shift register may be applied directly to the bottom of the appropriate potentiometer, thus eliminating the switching transistors shown. As is readily apparent an unlimited number of timed programs may be provided for the instant embodiment one program will be enabled at any one time.

An alternative arrangement is shown in FIG. 4 which uses diodes for selective switching instead of transistor switches and requires zero voltage at one of the inputs $b1$ to $b4$ to select the appropriate sequence. This may be arranged through a shift register as described above with reference to FIG. 3.

In this connection the circuit disclosed is adapted to select one time setting out of several by means of a biasing voltage applied to the $b1, b2, b3$ and $b4$ control terminals. This circuit functionally differs from that in FIG. 3 in that rail 4 voltage is applied to those inputs it is desired to lock out. If, for example, control terminal $b1$, is allowed to float, the junction point of the cathodes of the three diodes D2, D6 and D7 will assume the potential of the potentiometer R4 wiper less one diode drop, and the capacitor C3 will charge to this voltage. The circuit point 8 will have to charge to this voltage plus one diode drop, i.e., the potentiometer voltage, before diode D7 will unblock to the pulse voltage.

Several forms of control systems have now been described but it should be understood that other forms are also possible within the scope of this invention.

What I claim is:

1. In a control system for timing a predetermined sequence of functions in an industrial process, electrical supply means, a voltage developing RC charging circuit connected to said potential supply means, a plurality of resistive circuits connected in parallel to said potential supply means and each being assigned to the timing of a respective funtion, a voltage comparator circuit having a plurality of inputs, a first one of which is connected to the capacitor charged terminal of said RC charging circuit, a common link between said resistive circuits and voltage comparator circuit, and means for seletively connecting each of said resistive circuits through said common link to the second input of said voltage comparator circuit, said voltage comparator circuit deriving an output control signal when the voltage of said RC charging circuit is of a predetermined relationship to the voltage applied by the connected resistive circuit.

2. Apparatus as claimed in claim 1, wherein each resistive circuit comprises a potentiometer adjustable to determine the voltage applied to the voltage comparator circuit.

3. Apparatus as claimed in claim 2, wherein each resistive circuit also comprises a resistance serially connected with the potentiometer, and the voltage applied to the voltage comparator circuit is derived from a tapping on the potentiometer.

4. Apparatus as claimed in claim 1, wherein said control system further includes diode means in circuit with said first input and said capacitor charge terminal.

5. Apparatus as claimed in claim 1, wherein said means for selectively connecting each of said plurality of resistive circuits includes transistor switch means connected to respective outputs of a shift register which is stepped from stage to stage by said output control signals.

6. Apparatus as claimed in claim 5, wherein said RC charging circuit includes a timing capacitor, wherein said transistor switch means includes a plurality of transistor switches a first one of which includes a resistor means connected to said capacitor charged terminal and operable to prevent charging of said timing capacitor by discharging voltage impressed on said capacitor through said resistor whenever the remainder of said transistor switches are in circuit with said resistive circuits to individually energize said circuits upon application of a positive current to the input terminal of said switches connected thereto.

7. Apparatus as claimed in claim 1, wherein said voltage comparator circuit derives an output control signal when the voltage of the RC charging circuit exceeds a voltage applied by the connected resistive circuit.

8. In a control system for generating a control signal to time automatically a predetermined sequence of functions in an industrial process, a voltage source, an RC circuit including a capacitor connected to receive an electrical charge from said voltage source, a plurality of resistive circuits connected in parallel across said voltage source and each associated with the timing of an individual function in the sequence and providing an output voltage indicative of a parameter of the associated function, a common link between the resistive circuits and the RC circuit, means for connecting in turn to the common link the output of selected ones of said resistive circuits, and voltage comparator means in the common link to compare the voltage of the charge in the RC circuit with the output voltage of the connected resistive circuit, said voltage comparator means providing said output control signal when the former voltage is of a predetermined relationship to the latter voltage.

9. Apparatus as claimed in claim 8, wherein the voltage comparator means comprises a diode, a pulse generating transformer, and an output transformer whose primary winding is serially connected with the diode and the transformer, whereby pulses from the pulse generating transformer are normally blocked by the diode from passing through the output transformer util the voltage of the charge in the RC circuit is of a predetermined relationship to the output voltage of the connected resistive circuit.

10. Apparatus as claimed in claim 8, wherein a second electrical RC charging circuit is connected in parallel with the voltage source and its capacitor is connected also to receive the output voltage from the connected resistive circuit, the time constant of the second RC charging circuit being less than that of the first mentioned RC circuit.

11. Apparatus as claimed in claim 8, wherein the means of selectively connecting ones of the resistive circuits are switches connected to respective outputs of a shift register stepped from stage to stage by said output control signals.

* * * * *